United States Patent [19]
Newell et al.

[11] Patent Number: 5,691,818
[45] Date of Patent: Nov. 25, 1997

[54] SYSTEM AND METHOD FOR ENHANCING EDGES AND THE LIKE FOR ENGRAVING

[75] Inventors: Douglas G. Newell, Englewood; Karl F. Seibert, Kettering; David R. Seitz, Vandalia, all of Ohio

[73] Assignee: Ohio Electronic Engravers, Inc., Dayton, Ohio

[21] Appl. No.: 529,557

[22] Filed: Sep. 18, 1995

Related U.S. Application Data

[63] Continuation-in-part of Ser. No. 434,592, May 4, 1995, which is a continuation of Ser. No. 38,679, Mar. 26, 1993, Pat. No. 5,438,422, and a continuation of Ser. No. 125,938, Sep. 23, 1993, Pat. No. 5,440,398, which is a continuation-in-part of Ser. No. 22,127, Feb. 25, 1993, Pat. No. 5,424,845.

[51] Int. Cl.⁶ .............................. B41C 1/04; H04N 1/40
[52] U.S. Cl. .................................... 358/299; 358/298
[58] Field of Search ............................ 358/296, 298, 358/299, 443, 447, 448, 450, 454–461, 465, 466, 530–536, 540; 395/109, 112, 128; 356/372–387; 382/141, 254, 266, 276, 283, 284, 286, 299

[56] References Cited

U.S. PATENT DOCUMENTS

| | | | |
|---|---|---|---|
| Re. 23,914 | 12/1954 | Boyajean | 178/6.6 |
| 2,112,010 | 3/1938 | Brimberg | 178/6.6 |
| 2,160,951 | 6/1939 | Alice | 178/13 |
| 2,164,209 | 6/1939 | Howey et al. | 178/5.6 |
| 2,441,651 | 5/1948 | Thompson | 179/100.41 |
| 2,925,464 | 2/1960 | Raible | 178/6.6 |
| 3,280,252 | 10/1966 | Lilien et al. | 178/6 |
| 3,612,753 | 10/1971 | Korman | 178/5.2 A |
| 3,769,455 | 10/1973 | De Vos et al. | 178/6.6 B |

(List continued on next page.)

OTHER PUBLICATIONS

"Datwyler," MDC Max Datwyler Corp., USA, 13420 W. Reese Blvd., Huntersville, NC 28078, undated brochure.

"Polishmaster Junior High–Precision Machining and Measuring Center for Rotogravure Cylinders," MDC Max Datwyler AG, CH–3368 Bleienbach/Schweiz, Switzerland, undated.

"Finishmaster Unit for Polishing of Rotogravure Cylinders After Copper or Chrome Plating," MDC Max Datwyler Ag, CH–3368 Bleienbach/Schweiz, Switzerland, undated.

(List continued on next page.)

*Primary Examiner*—Eric Frahm
*Attorney, Agent, or Firm*—Jacox, Meckstroth & Jenkins

[57] ABSTRACT

A method and apparatus for engraving wherein the engraver includes a merge system for merging image data to be engraved in a manner which will reduce or eliminate "halo" and/or "ghost" images. The method utilizes a processor in an engraver for creating image data comprising continuous tone data and line work data. The method further involves the steps of locating transition data corresponding to where the continuous tone data and line work data meet; and processing at least some of the image data to provide processed image data using the transition data located in the locating step. The engraver has an engraving bed; a headstock and a tailstock located on the engraving bed for rotatably supporting a cylinder to be engraved; an engraving head located on the engraving bed for engraving the cylinder; an image data generator coupled to the engraving head, the image data generator being capable of creating image data comprising continuous tone data, line work data and transition data. The image data generator comprises a locator for locating the transition data and a processor associated with the locator for processing at least some of the image data to provide processed image data using the transition data located by the locator. The system and method facilitate selectively enhancing at least one edge or area within a data set, such as either a line work data set or a continuous tone data set, while selectively avoiding enhancing other areas, such as an area between a line work area and continuous tone area of an image.

8 Claims, 12 Drawing Sheets

U.S. PATENT DOCUMENTS

| | | | |
|---|---|---|---|
| 3,770,888 | 11/1973 | De Vos et al. | 178/6.6 B |
| 3,784,739 | 1/1974 | De Vos et al. | 178/6.6 B |
| 3,918,348 | 11/1975 | Runft | 90/11 R |
| 3,956,583 | 5/1976 | Pugsley | 358/299 |
| 4,007,362 | 2/1977 | Sindermann | 235/151 |
| 4,052,739 | 10/1977 | Wada et al. | 358/299 |
| 4,079,235 | 3/1978 | Froyd et al. | 364/107 |
| 4,126,821 | 11/1978 | Cannon | 318/696 |
| 4,174,527 | 11/1979 | Schaefer | 358/267 |
| 4,245,260 | 1/1981 | Doelves | 358/299 |
| 4,259,697 | 3/1981 | Doelves | 358/299 |
| 4,342,052 | 7/1982 | Rackley et al. | 358/287 |
| 4,347,785 | 9/1982 | Chase et al. | 101/1 |
| 4,357,633 | 11/1982 | Buechler | 358/299 |
| 4,422,101 | 12/1983 | Takei | 358/299 |
| 4,450,486 | 5/1984 | Buechler | 358/299 |
| 4,451,856 | 5/1984 | Buechler | 358/299 |
| 4,484,232 | 11/1984 | Gast | 358/299 |
| 4,500,929 | 2/1985 | Buechler | 358/299 |
| 4,603,391 | 7/1986 | Inoue et al. | 364/474 |
| 4,678,976 | 7/1987 | Inoue | 318/577 |
| 4,683,500 | 7/1987 | Kitamura et al. | 358/280 |
| 4,688,101 | 8/1987 | Doelves et al. | 358/299 |
| 4,729,037 | 3/1988 | Doelves | 358/299 |
| 4,944,593 | 7/1990 | Kalstroem et al. | 356/379 |
| 4,972,323 | 11/1990 | Cauwet | 364/474.29 |
| 5,029,011 | 7/1991 | Fraser | 358/299 |
| 5,196,942 | 3/1993 | Shiau | 358/298 |
| 5,229,861 | 7/1993 | Nozaka et al. | 358/299 |
| 5,293,426 | 3/1994 | Wouch et al. | 382/1 |
| 5,329,215 | 7/1994 | Fraser et al. | 318/603 |

OTHER PUBLICATIONS

"Cu–Master Type E Plating Tanks for Copper–Plating of Rotogravure Cylinders," MDC Max Datwyler AG, CH–3368 Bleienbach/Schweiz, Switzerland, undated.

"Cr–Master Type E Plating Tanks for the Chrome–Plating of Rotogravure Cylinders," MDC Max Datywler AG, CH–3368 Bleienbach/Schweiz, Switzerland, undated.

"Twin–Pilot," Maschinenfabrik Kaspar Walter GmbH & Co., KG, Phinganserstrasse 22, 8000 Munchen 70, Germany, undated brochure.

JAV, "Getting Better Accuracy with Non–Precision Ball Screws," American Machinist, Feb. 1993, pp. 50–51.

*Signal Processing Algorithms Using Fortran and C* by Samuel D. Sterns and Ruth A. David Prentice Hall: Englewood Cliffs, NJ, 1993, p. 103.

*System Identification and Control Design Using P.I.M. + Software* by Ioan Dore Landau Prentice Hall: Englewood Cliffs, NJ, 1990, p. 134.

"Cu–Master Type E Plating Tanks for Copper–Planting of Rotogravure Cylinders," MDC Max Datwyler AG, CH–3368 Bleienbach/Schweiz, Switzerland, undated.

PRIOR ART

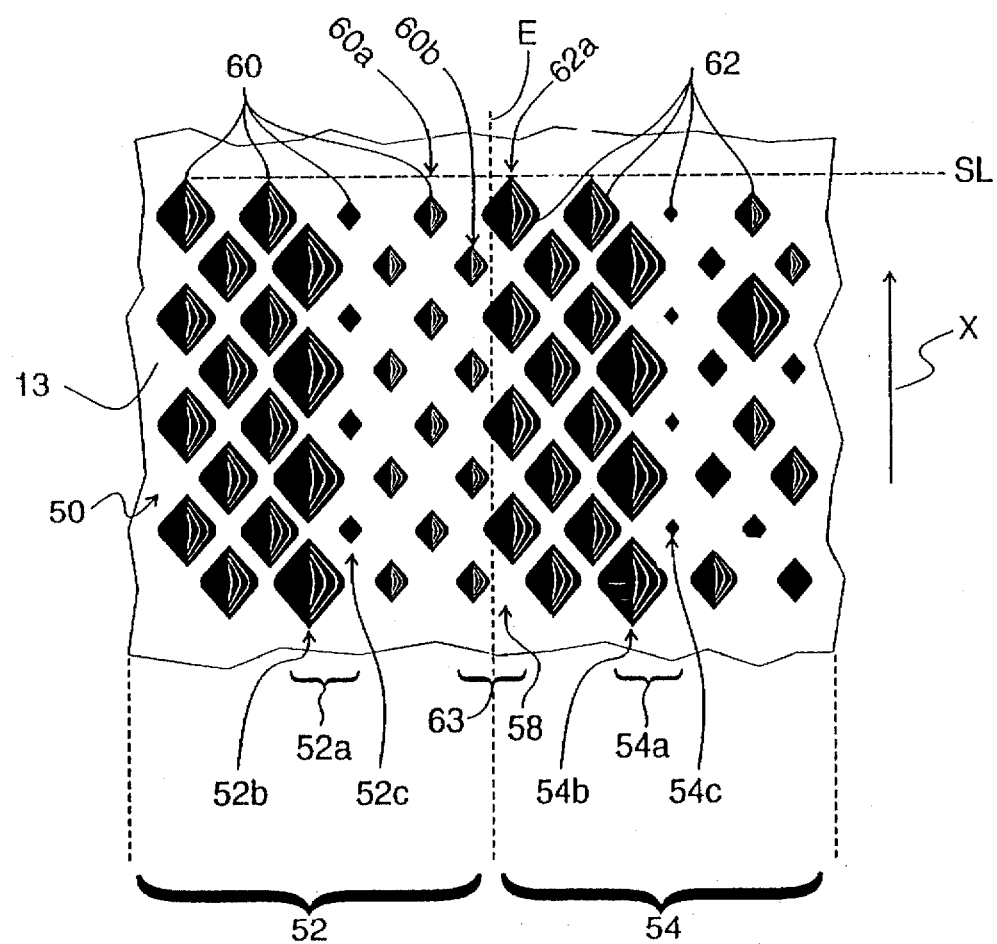

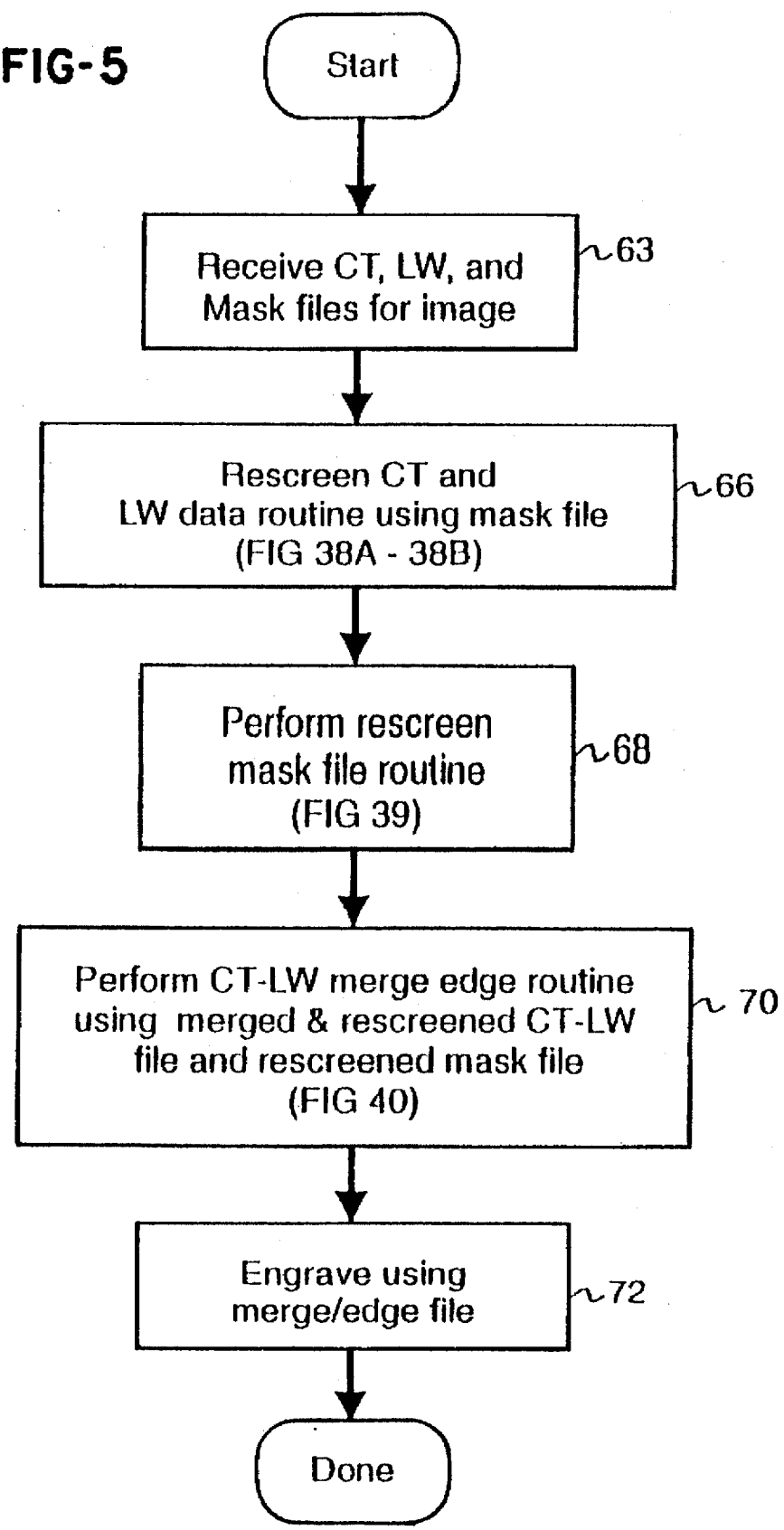

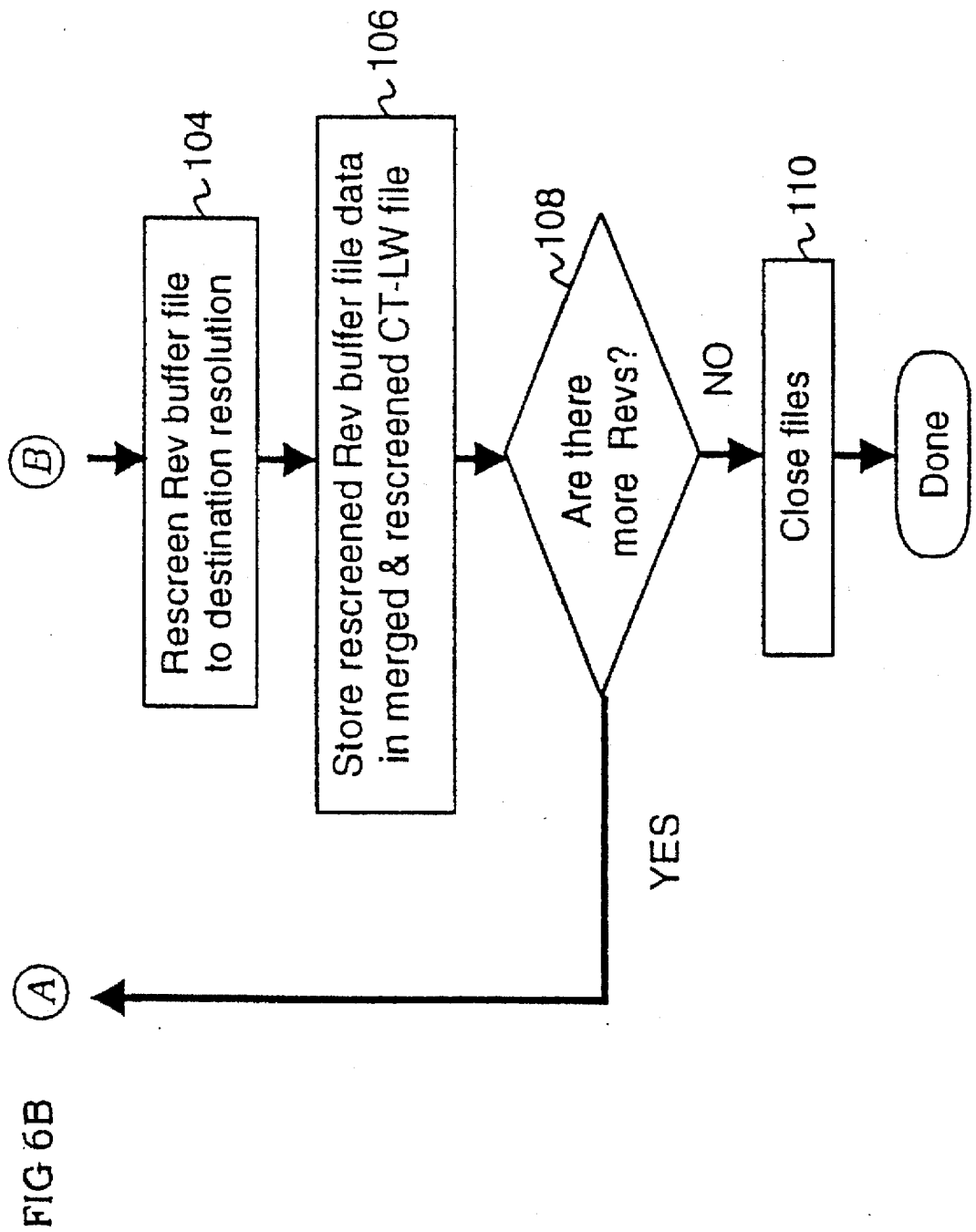

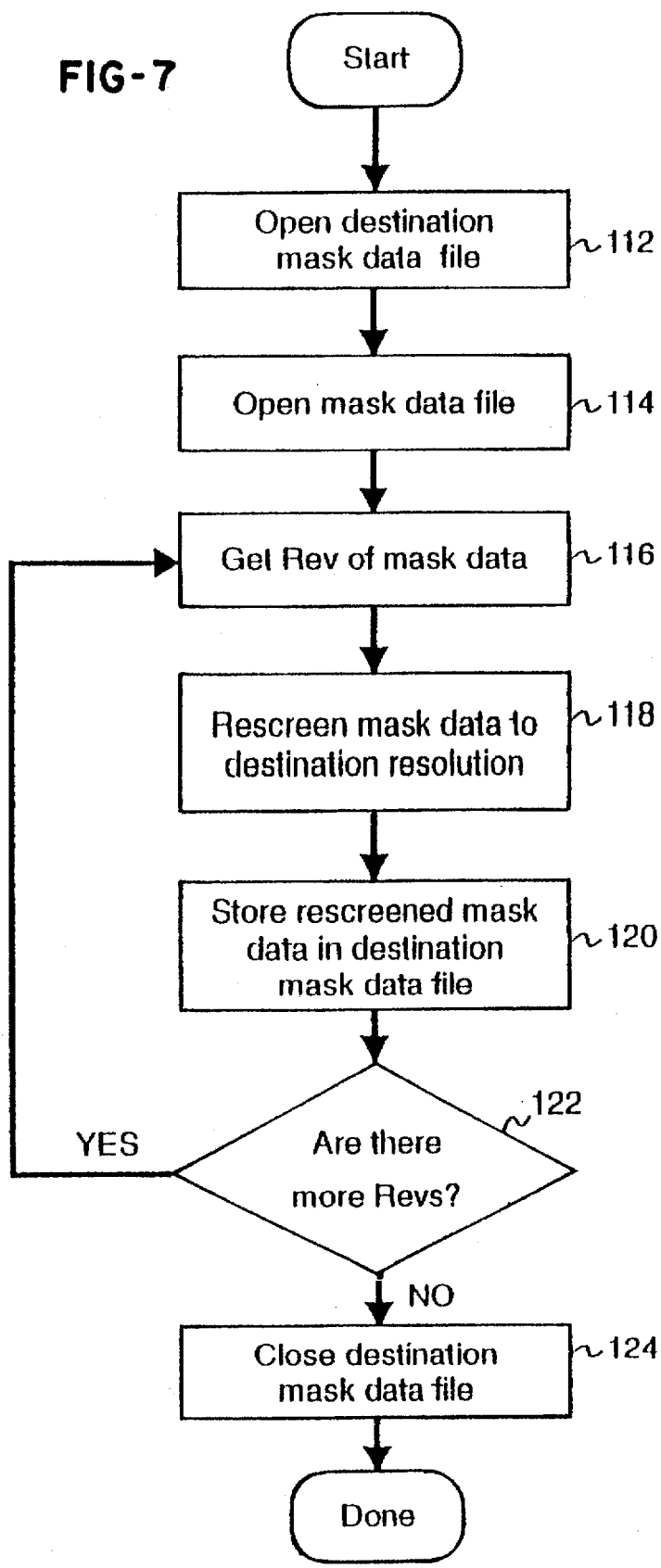

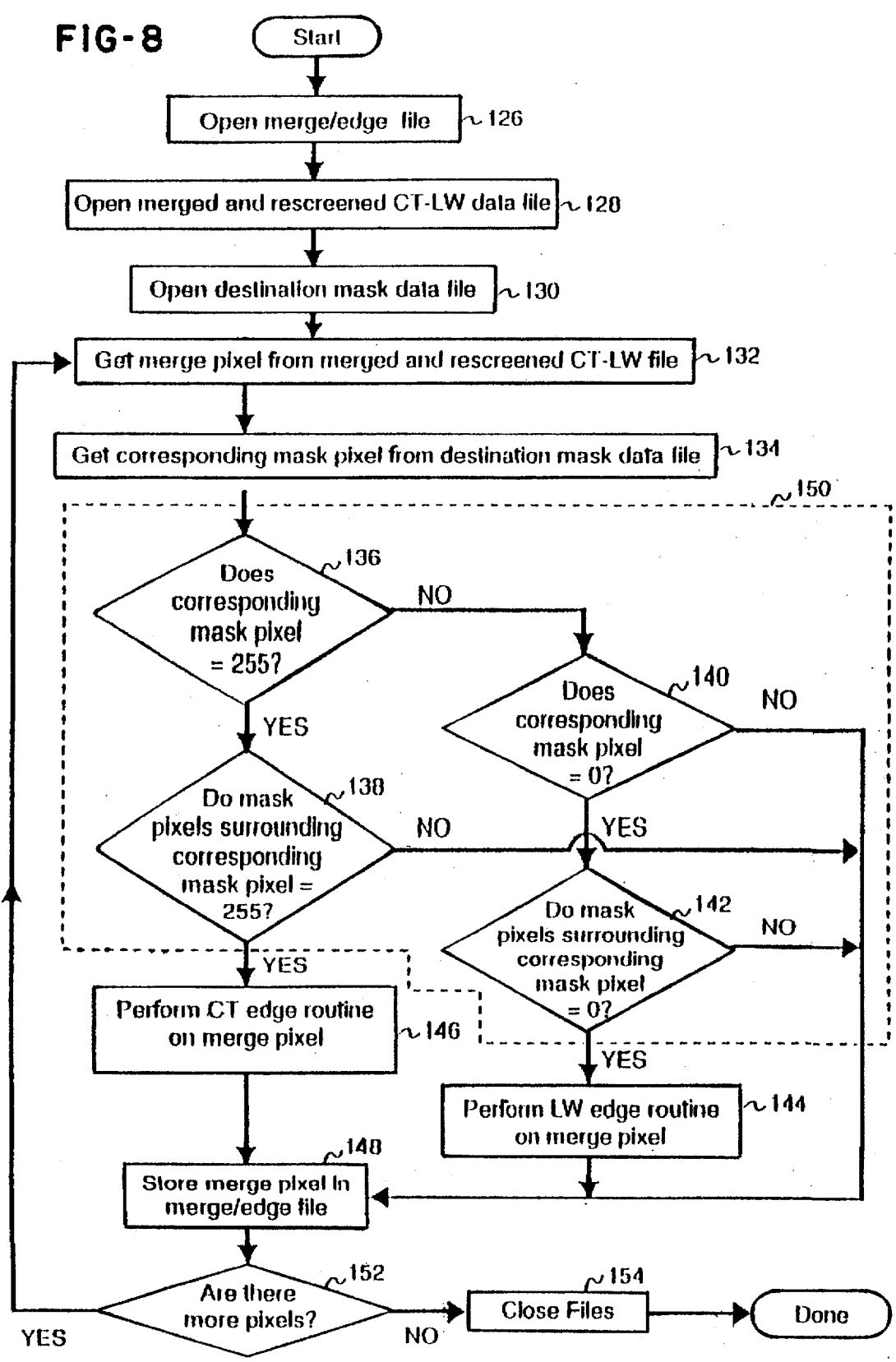

SYSTEM AND METHOD FOR ENHANCING EDGES AND THE LIKE FOR ENGRAVING

CROSS REFERENCE TO RELATED APPLICATIONS

This application is a continuation-in-part of copending U.S. patent application Ser. No. 08/434,592 filed May 4, 1995, which is a continuation of U.S. application Ser. No. 08/038,679 filed Mar. 26, 1993, now U.S. Pat. No. 5,438,422 and a continuation of Ser. No. 08/125,938 filed Sep. 23, 1993, now U.S. Pat. No. 5,440,398, which is a continuation-in-part of Ser. No. 08/022,127 filed Feb. 25, 1993, now U.S. Pat. No. 5,424,845.

BACKGROUND OF THE INVENTION

1. Field of the Invention

This invention relates to engraving and, more particularly, to the art of engraving desired geometric patterns on a surface of a cylinder, and more particularly, to combining image data sets to reduce or eliminate "halo" or "ghost" effects during printing.

2. Description of Related Art

An engraver creates periodic ink-receiving cavities, cells or areas on a printing cylinder by rotating the cylinder about its cylindrical axis while moving an engraving head in a direction parallel to the cylinder axis. Engraved areas are engraved on the surface of the cylinder by oscillating an engraving device, such as a diamond stylus, into engraving contact with the cylinder. A cell or cavity is engraved each time the stylus is oscillated into contact with the printing cylinder. The resulting cavities are arranged along a continuous helical track or in adjacent cylindrical tracks.

The stylus may be mounted on the engraving head as generally described in Buechler, U.S. Pat. No. 4,450,486 and may be controlled as described in U.S. Pat. Nos. 5,438,422 and 5,424,845. As explained in those patents, the stylus is oscillated at a frequency having an odd number of half wavelengths during a full engraving rotation. This causes a staggering of engraved areas engraved on successive rotations of the cylinder. The engraving head is advanced an axial distance equal to one-half of a black cell width plus one-half of a connecting channel width, plus one separating wall width during each complete rotation of the printing cylinder. This causes a nesting of cavities which are engraved during successive rotations.

As also taught by those patents, the engraver engraves cavities having a size which corresponds to a grey level to be printed by the printing cylinder. The cavity depth is controlled by a stylus driver acting in response to combined levels of a DC video signal, a white offset signal, and an AC signal. The DC gain and the AC gain may be controlled by a set-up circuit in accordance with a series of set-up parameters.

A problem with prior art systems is shown with respect to FIGS. 2 and 3 which illustrate a series of engraved areas corresponding to an image A1 comprising both line work and continuous tone images. In general, line work corresponds to areas having only a few density levels and which define a sharp or high density contrast, such as with letter and/or number characters. Continuous tone image areas typically correspond to a portion of the image which comprises a plurality of density levels, such as is typically the case with an image of a person's face.

For ease of illustration, the area A1 (FIG. 2) to the left of dashed line A corresponds to a line work portion of the image, while the area A2 to the right of dashed line A corresponds to the continuous tone portion of the image. Notice in FIG. 2 that a merge or transition area A3 is defined by a column of line work engraved areas or cells and a column of continuous tone engraved areas or cells immediately to the left and right, respectively, of dash line A. In some prior art systems, it was desirous to enhance edges within the image to accentuate or emphasize edges appearing in either the line work area or continuous tone area of the image. Accordingly, an edge enhancement routine for enhancing the edges was provided.

As illustrated in FIG. 3, notice that the column of cells adjacent a line work edge (represented by dash line B in FIG. 3) in line work area A1 were modified so that the column of cells to the immediate left of dashed line B were enlarged, while the column of cells to the immediate right of dash line B were reduced in size. This caused the line work edge to be emphasized by increasing the density contrast between these columns.

Similarly, notice in the continuous tone area A2' that the columns of cells adjacent dash line C in FIG. 3 represent a continuous tone edge. The data associated with these cells was processed to also enhance the contrast of the continuous tone edge.

Unfortunately, the prior art systems also "outsmarted" themselves by enhancing all data corresponding to edges within an image. Thus, even transition data corresponding to a transition area between the line work area A1 and continuous tone area A2, such as the edge defined by dashed line D in FIG. 3, was processed to enhance the contrast at the transition between the continuous tone and line work area. Notice that a column of continuous tone cells D1 to the right of line D have been enlarged, while the column of line work cells D2 to the left of line D have been reduced, thereby enhancing the transition edge or the contrast between the continuous tone area A2' and line work area A1'.

As illustrated in the picture shown in FIG. 9, this undesired transition edge enhancement caused undesirable or unwanted "haloing" or "ghosting", indicated by arrow Y in FIG. 9.

Accordingly, there is a need for a system and method which will facilitate merging image data in order to avoid these unwanted characteristics.

SUMMARY OF THE INVENTION

A primary object of this invention is to provide a system and method for merging various types of image data which will subsequently be used, for example, in an engraving environment.

Another object is to provide a system and method which will reduce or eliminate unwanted "ghost" or "halo" images.

Another object of this invention is to provide a system and method for creating and/or merging image data comprising continuous tone data, line work data and transition data comprising a locator for locating the transition data, and a processor associated with the locator for processing at least some of the image data to provide processed image data using the transition data located by the locator.

Another object of this invention is to provide a method for selectively enhancing an image file corresponding to an image, comprising the steps of: analyzing the image file corresponding to the image wherein the image file comprises a first data set and a second data set which cooperate to define transition data corresponding to at least one transition between the first and second data sets; identifying the transition data in the image file; and processing the image file to provide a processed image file in response to the transition data identified in the identifying step to cause the image to comprise at least one predetermined characteristic.

Still another object of the invention is to provide a system and method which will facilitate selectively enhancing at least one edge or area within a data set, such as either a line work data set or a continuous tone data set, while selectively avoiding enhancing other areas, such as an area between a line work area and continuous tone area of an image.

In one aspect, this invention comprises a method for enhancing an image file corresponding to an image, comprising the steps of: analyzing the image file corresponding to the image, the image file comprising a first data set and a second data set, the first and second data sets cooperating to define transition data corresponding to at least one transition between the first and second data sets; identifying the transition data in the image file; and processing the image file to provide a processed image file in response to the transition data identified in the identifying step to cause the image to comprise at least one predetermined characteristic.

In another aspect, this invention comprises method for enhancing an image file corresponding to an image, comprising the steps of: analyzing the image file corresponding to the image, the image file comprising a first data set and a second data set, the first and second data sets cooperating to define transition data corresponding to at least one transition between the first and second data sets; identifying the transition data in the image file; and processing the image file to provide a processed image file in response to the transition data identified in the identifying step to cause the image to comprise at least one predetermined characteristic.

In another aspect, this invention comprises a system for creating image data comprising continuous tone data, line work data and transition data, the system comprising: a locator for locating the transition data; and a processor associated With the locator for processing at least some of the image data to provide processed image data using the transition data located by the locator.

Another object of the invention is to provide a system and method which will facilitate merging data for subsequent use in an engraving or image-processing procedure.

Still another object is to provide a system and method which will facilitate identifying transition areas or edges between sets of data.

Other objects and advantages of the invention will be apparent from the following written description, the attached drawing and the appended claims.

BRIEF DESCRIPTION OF ACCOMPANYING DRAWINGS

FIG. 4 is a fragmentary view of a cylinder engraved in accordance with the system and method of another embodiment in the invention wherein selective edge enhancement is performed;

FIG. 5 is a general flow chart of a method in a controller 17 according to another embodiment of this invention;

Figure 6A:
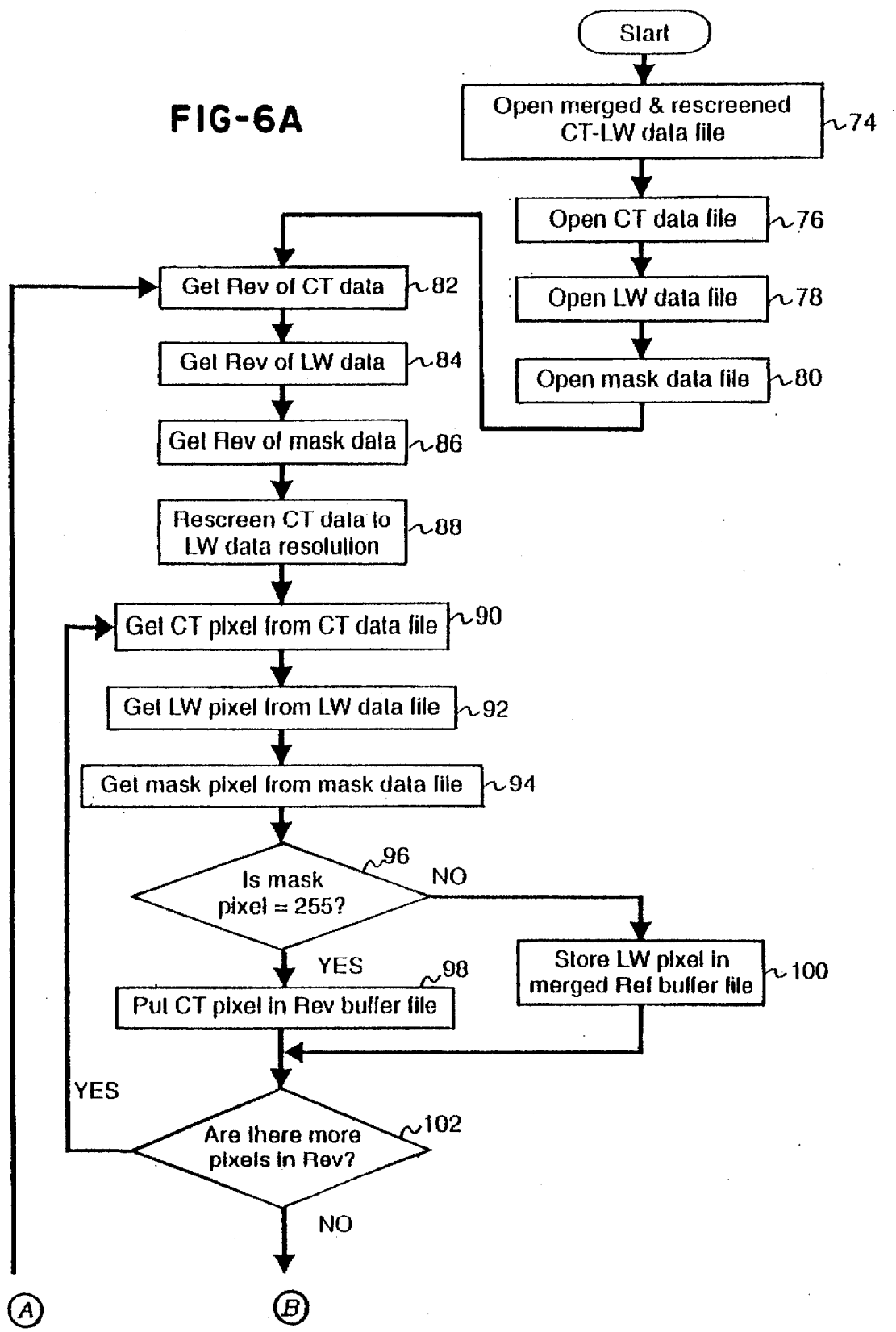
Figure 9:
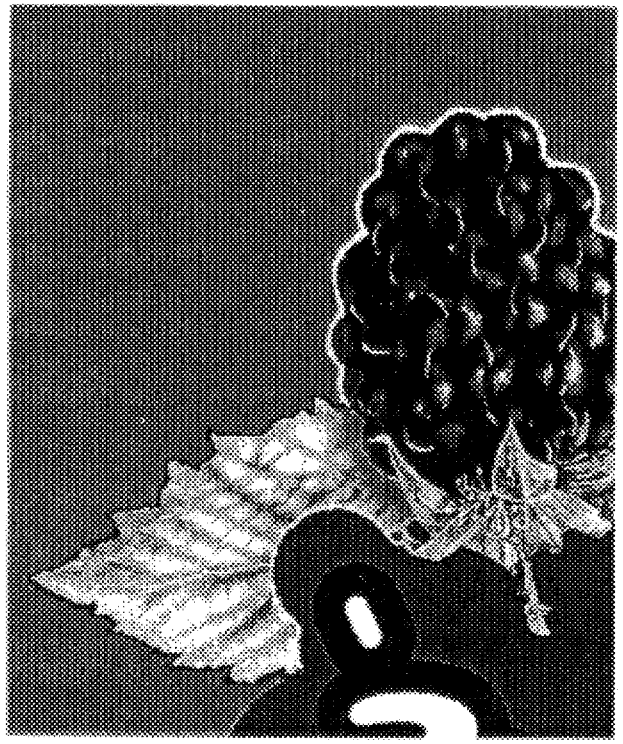
Figure 10:
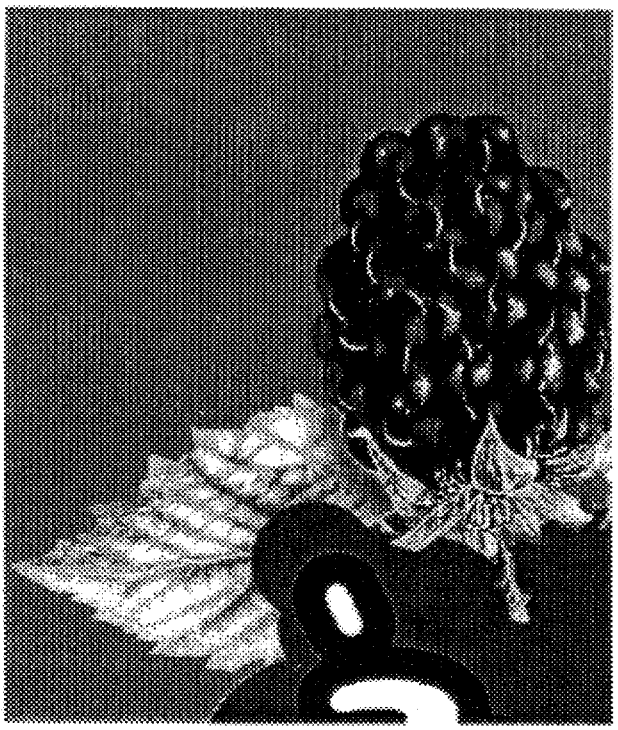

FIGS. 6A and 6B, taken together, show a flow chart of a merge and rescreen routine used to merge and rescreen continuous tone and line work data associated with an image;

FIG. 7 is a mask file rescreening routine for rescreening a mask file of data;

FIG. 8 is a flow chart of a merge edge routine performed by controller 17;

FIG. 9 is a view of an image engraved in accordance with the prior art showing "haloing" or "ghosting" problems of the past;

FIG. 10 is a view of the image shown in FIG. 41 after engraving in accordance with the embodiment shown relative to FIGS. 1–9 showing the reduction or elimination of "haloing" or "ghosting" problems.

Figure 11A:
Figure 11B:
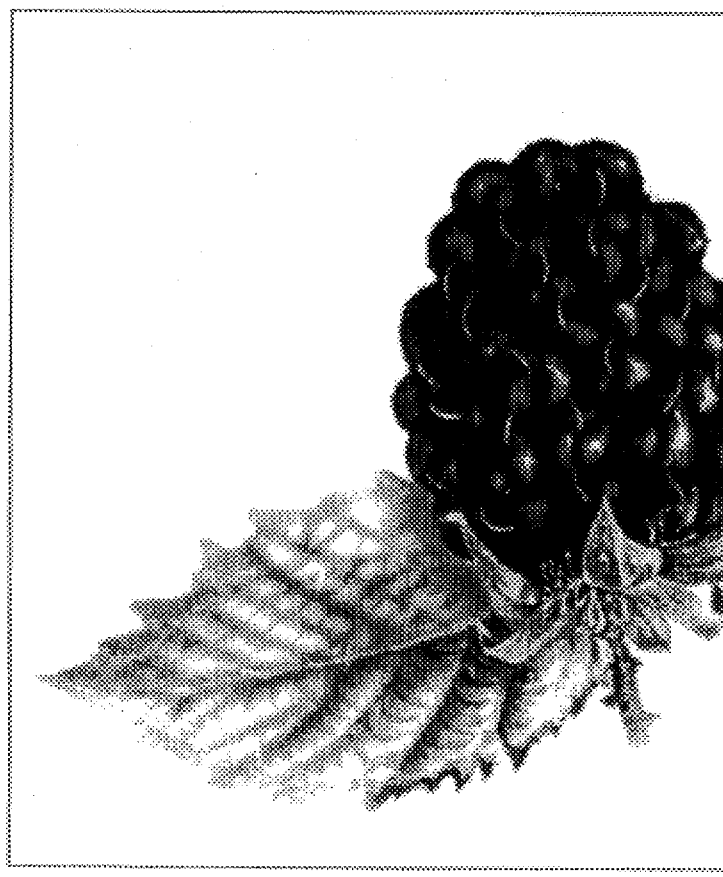
Figure 11C:
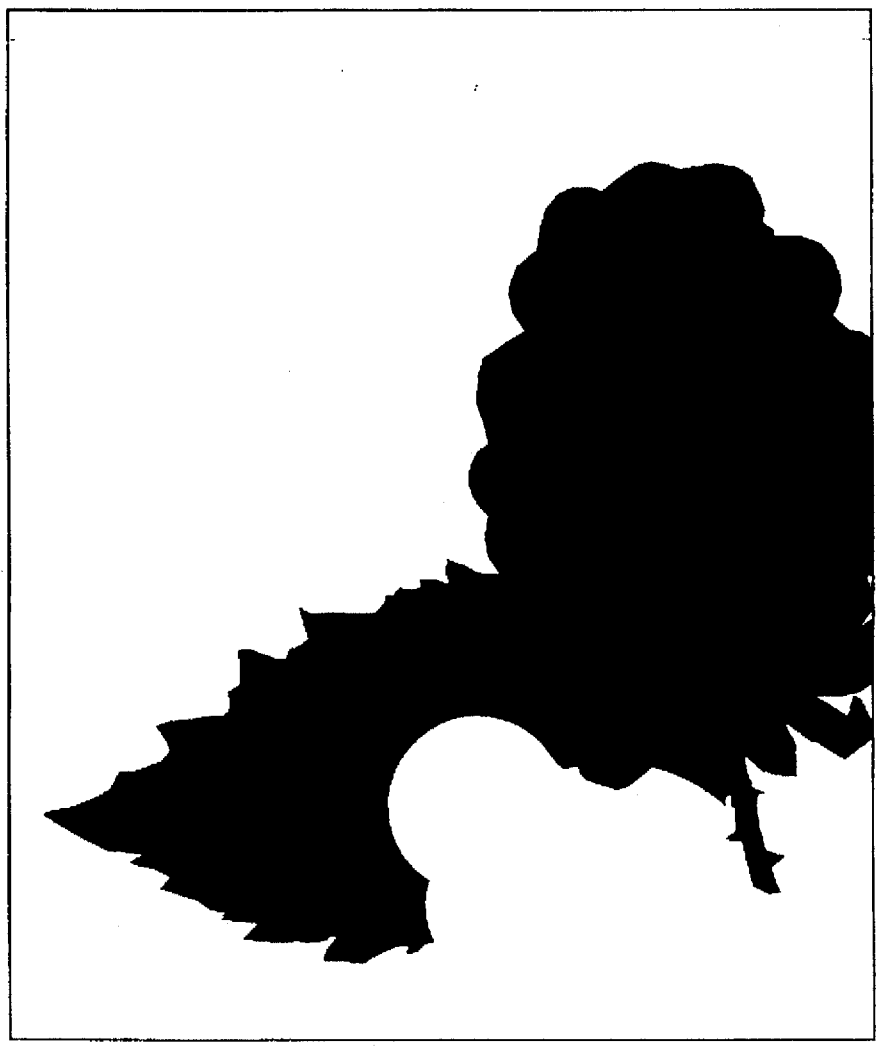

FIG. 11A is a view of a line work potion of an image;

FIG. 11B is a view of a continuous tone portion of an image;

FIG. 11C is a view of a mask corresponding to the line work and continuous tone portions of the images of FIGS. 11A and 11B.

DETAILED DESCRIPTION OF PREFERRED EMBODIMENT

Figure 1:
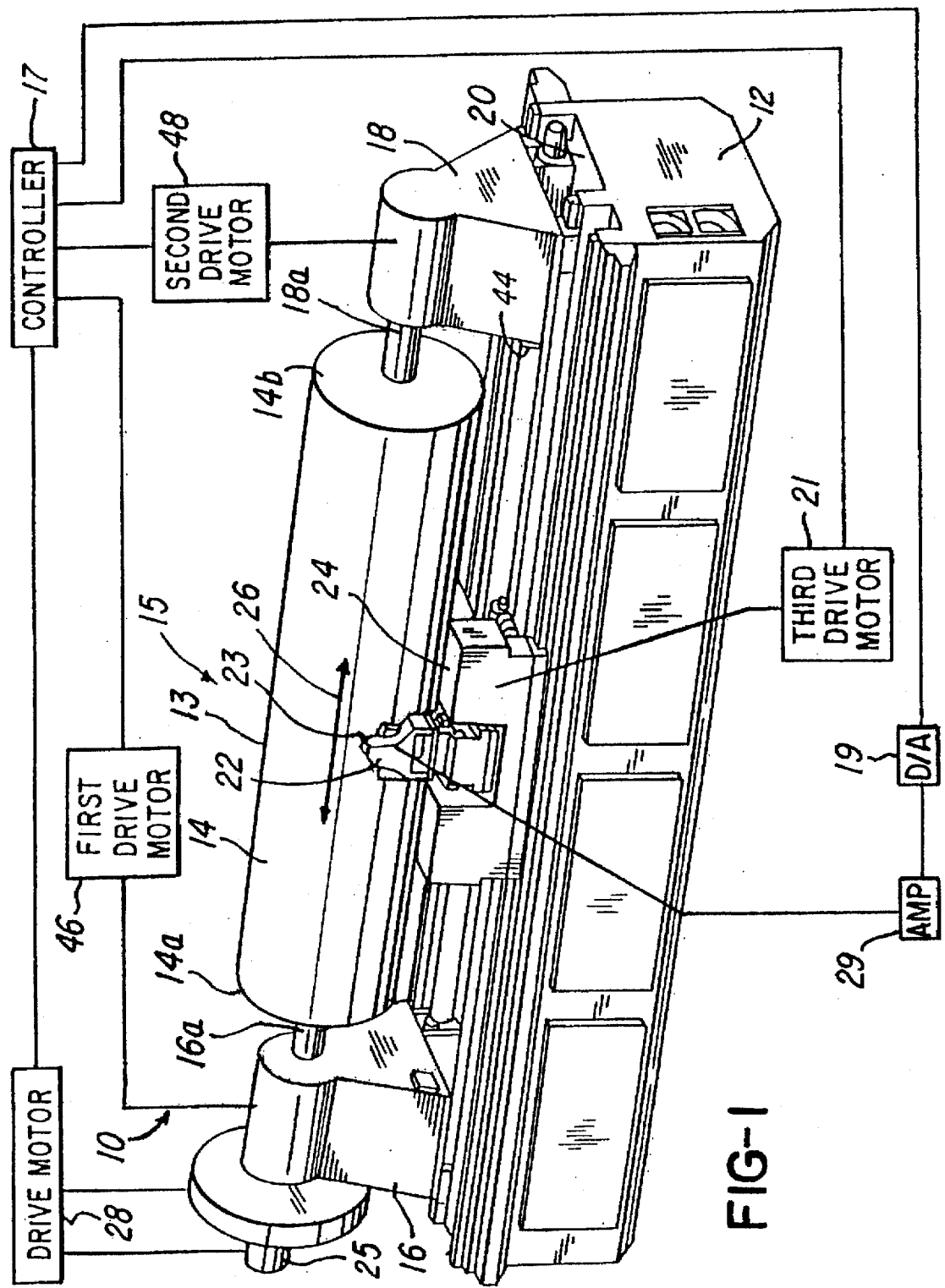
FIG. 1 is a general schematic view of an engraver 10 according to another embodiment of this invention.
Figure 2:
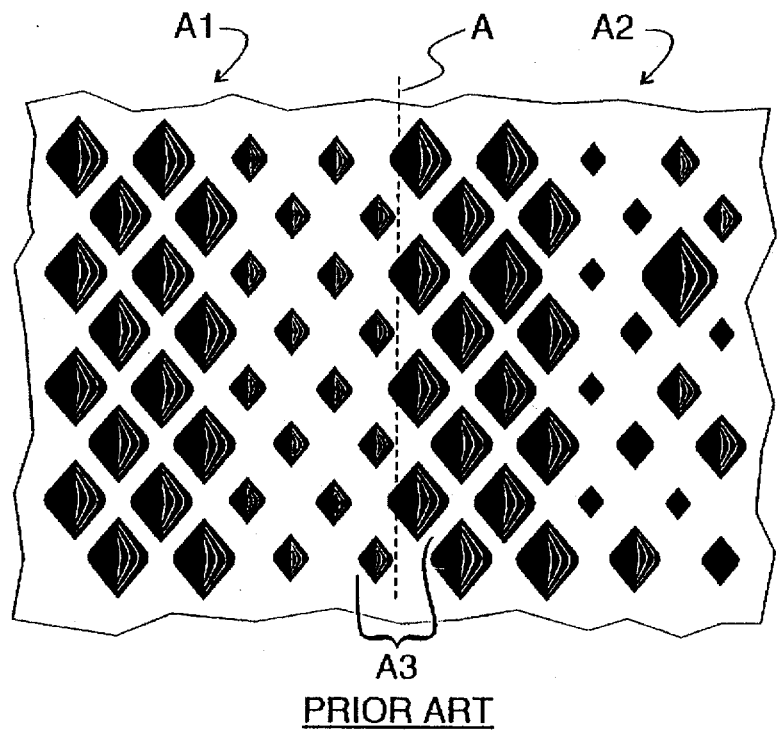
FIG. 2 is a partly broken away fragmentary view of a portion of a prior art cylinder showing a plurality of engraved areas comprising both continuous tone and line work areas.
Figure 3:
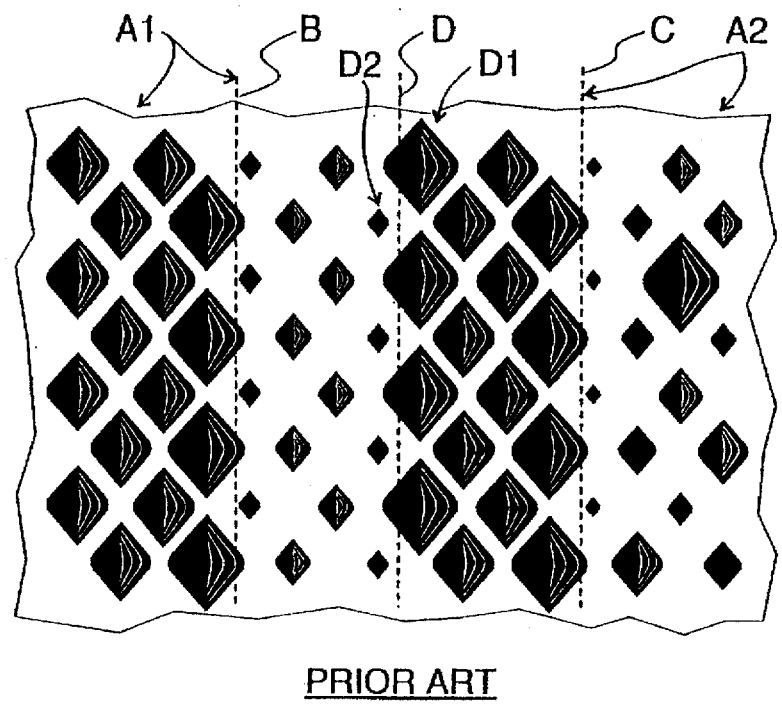
FIG. 3 is a fragmentary view of a prior art cylinder showing a plurality of engraved areas when non-selective edge enhancement was performed on all engraved areas.

FIG. 1 is a general perspective view of a preferred embodiment of an engraver, designated generally as engraver 10. In the embodiment being described, the engraver 10 is a gravure engraver, but the invention may be suitable for use in other engravers, such as laser engraving. The engraver 10 may have a surrounding, slidable safety cabinet structure which is not shown for ease of illustration. Engraver 10 comprises a base 12 having a headstock 16 and a tailstock 18 slidably mounted in track 20 such that the headstock 16 and tailstock 18 can move towards and away from each other. In this regard, engraver 10 comprises a plurality of linear actuators or first drive motor means or first drive motor 46 and a second drive motor means or second drive motor 48 which are capable of driving the headstock 16 and tailstock 18, respectively, towards and away from each other. For example, the drive motors may cause the headstock 16 and tailstock 18 to be actuated to a fully retracted position (not shown) or to a cylinder support position shown in FIG. 1.

The drive motors may be selectively energized to cause the headstock 16 and tailstock 18 to be actuated either independently or simultaneously. Although not shown, a single drive motor may be used with a single leadscrew (not shown) having reverse threads on which either end causes the headstock 16 and tailstock 18 to move simultaneously towards and away from each other as the leadscrew is driven. Driving both headstock 16 and tailstock 18 permits cylinders 14 of varying lengths to be loaded by an overhead crane, for example, whose path is perpendicular to the axis of rotation of the cylinder 14. Although not shown, it should be appreciated that a stationary headstock 16 or tailstock 18 may be used with a driven tailstock 16 or headstock 18, respectively.

The headstock 16 and tailstock 18 comprise a first support cone or shaft 16a and a second support cone or shaft 18a, respectively. The support shaft 16a and 18a each comprises a conically shaped end which is suitable for engaging and rotatably supporting cylinder 14 at an engraving station 15 of engraver 10. In this regard, the cylinder 14 comprises a first end 14a and a second end 14b, each having a receiving opening for a receiving end, respectively. The receiving openings in ends 14a and 14b are conically shaped in cross-section so as to matingly receive the ends of cones 16a and 18a.

Although not shown, if a shafted cylinder (not shown) was to be engraved, then headstock 16 and tailstock 18 would each include a gripping device or chuck (not shown) for receiving the shafts and also for rotatably supporting the cylinder 14 at the engraving station 15.

The engraver 10 also comprises an engraving head 22 having an engraving device, such as a cutting tool or stylus 23 for engraving a surface 13 of cylinder 14. In the embodiment being described, the engraving device 23 preferably has a diamond stylus; however, it should be appreciated that the invention may be used with other types of engraving devices, including, for example, laser engraving devices.

The engraving head 22 is slidably mounted on a carriage 24 such that a third drive means or third drive motor 21 can drive the engraving head 22 towards and away from the surface 13 of cylinder 14 in a direction which is generally radial with respect to the rotational axis of cylinder 14. The carriage 24 is also slidably mounted on base 12 such that it traverses the entire surface 13 of cylinder 14 in the direction of double arrow 26 in FIG. 1, which is generally parallel to the axis of the cylinder 14. The engraver 10 also comprises a lead screw (not shown) and drive motors (not shown) for causing the carriage 24 to move in the direction of double arrow 26. The engraving head 22, carriage 24 and transverse movement thereof is similar to that shown in U.S. Pat. Nos. 5,438,422, 5,424,845 and 5,329,215 which are assigned to the same assignee as the present invention and which are incorporated herein by reference and made a part hereof.

The engraver 10 also comprises drive means or a drive motor 28 for rotatably driving the support member 16a, cylinder 14, and support member 18a. The drive motor 28 is also operatively coupled to the controller 17, as shown.

The engraver 10 further comprises a programmable controller or processor 17 which controls the operation of the engraver 10 and which also controls drive motors 21, 28, 46 and 48 mentioned earlier herein.

Although not shown, the engraver 10 may further comprise a support or support means for supporting the cylinder 14 between headstock 16 and tailstock 18, for example, during loading and unloading.

Controller 17 is also coupled to engraving head and is capable of energizing engraving head 22 to engraver at least one controlled-depth area or cell as carriage 24 traverses surface 13 of cylinder 14 in a manner described later herein.

In accordance with an embodiment of the invention, an improved engraving method and system is provided for enhancing image file data corresponding to an image so that such image file data can be merged, modified or manipulated to cause the image to comprise at least one predetermined characteristic, such as a selectively enhanced or sharpened edge. It should be understood that features of this invention may be used in various types of engraving, such as gravure, laser and etching, and features may also be used in printing and proofing.

As illustrated in FIG. 4, improved edge definition may be obtained for an engraved pattern 50 comprising a plurality of engraved areas, such as areas 52, and 54 on surface 13 of cylinder 14 (FIG. 1). It should be appreciated that FIG. 4 illustrates only a fragmentary portion of surface 13 of cylinder 14 which is rotating about its cylindrical axis to produce a surface motion or rotation indicated by arrow X in FIG. 4.

Notice that a transition or edge area 58 is defined along dashed line E by the engraved areas 52 and 54. In general, the engraved areas 52 and 54 are arranged in a series of nested columns, each having a plurality of lead cells or engraved areas 60 and 62, respectively which begin a plurality of vertical columns (as viewed in FIG. 4). It should be appreciated that these adjacent columns and cavities of engraved areas are produced by oscillating the engraving device or stylus 23 (FIG. 1) into engraving contact with cylinder 14 during success of helical or cylindrical passes about cylinder 14.

The engraver 10 may produce the engraved pattern 50 by commencing an imaginary start line SL (FIG. 4) to engrave a series of nested columns, such as column 60a. The engraving device 23 (FIG. 1) continues engraving until it transits past the imaginary start line SL and continuing until the beginning of another column, such as column 60b. In this embodiment, the engraved pattern 52 corresponds to line work data, while pattern 54 corresponds to continuous tone data. Notice that columns 60b and 62a cooperate to define a transition edge 58 within a transition area 63 where the patterns 52 and 54 meet. A feature of this invention comprises a system and method for identifying the transition data corresponding to this transition area 63 and processing the transition data as desired.

In this regard, the system and method for creating or engraving images using image data comprising continuous tone data, line work data and transition data is produced in accordance with this invention by merging, adjusting, modifying or, perhaps, even eliminating some of this data in order to provide a processed image data file which comprises at least One predetermined characteristic, such as a selectively enhanced edge. It should be appreciated that the transition data referred to above is comprised of those portions of the line work data and those portions of the continuous tone data which abut. For example, selective edge enhancement is produced or performed in accordance with this invention by identifying transition data associated with the transition areas, such as transition area 63, in the image data file and then processing the image data file to provide a processed image which comprises edges which are either enhanced or not enhanced as desired.

Features of this invention enable the image data file to be processed so that transition areas, such as transition area 63, are selectively excluded from the traditional edge enhancing, while, for example, line work edge area 52a (FIG. 4) within line work area 52 is enhanced.

In general, features of this invention are achieved by generating or providing a continuous tone data file (not shown) corresponding to the continuous tone portions 54 of the image to be engraved and a line work data file (not shown) corresponding to the line work portion 52 of the image to be engraved. In addition, a mask data file (not shown) is generated corresponding to a mask or template which differentiates the continuous tone area 54 from line work area 52 for the entire image to be engraved.

The mask data file is typically input by an operator, and it provides a binary representation which indicates the area in which the continuous tone or line work data is to be placed. For example, notice in FIG. the line work image in FIG. 9A and the continuous tone image in FIG. 9B and their associated mask of the image to be engraved. Thus, for example, pixels in a continuous tone data file associated with continuous tone areas, like area 54, in the image are set equal to 255 in the mask data file, while line work pixels in a line work data file associated with line work areas such as area 52 are set equal to zero. It should be appreciated, that these pixel values could be set at any predetermined level as may be necessary or desired to generate a mask, negative or template having any desired mask density characteristics.

As illustrated in FIG. 5, processor 17 receives the continuous tone, line work and mask data files associated with the image to be engraved (block 64) from suitable storage (not shown). At block 66, either one or both of the continuous tone or line work data files are rescreened to a predetermined resolution and merged using the mask data file. In this regard, it should be appreciated that the continuous tone data file is initially generated and stored in processor 17 at a resolution of about 100 to 500 dots per inch ("dpi"). In contrast, the line work data file is typically stored at a resolution of about 1000 to 3000 dpi. Consequently, it is desirable to rescreen one or both of the continuous tone and line work data files so that they are at about the same resolution. In this regard, it is been found that rescreening the continuous tone data file to about the resolution of the line work file (for example, from about 300 dpi to about 2000 dpi) is preferable. Once the continuous tone and line work data files are rescreened to compatible resolutions (block 66 in FIG. 5), then they are merged using the mask data file. In the embodiment being described, a merge and rescreen routine in accordance with the present invention is illustrated in FIGS. 6A–6B and described below.

Once the continuous tone and line work data file is merged and rescreened, then the mask data file is rescreened (block 68) from an initial mask file resolution of about 1000 to 3000 dpi to a predetermined mask file resolution which generally corresponds to the resolution of the desired engraving. In the embodiment being described, the predetermined mask file resolution is on the order of about 100 to 500 dpi. It should be appreciated that the rescreened mask data file will typically comprise three density ranges of pixel values. In this embodiment, the continuous tone area pixels are each set at 255, and the line work area pixels are set at 0. Finally, transition area pixels range in value from 1–254 hex. This rescreened mask data file, therefore, can subsequently be used to identify continuous tone, line work and transition areas between continuous tone and line work.

Once the mask data file is rescreened (block 68 in FIG. 5), then a continuous tone and line work merge edge procedure or routine is performed using the merged and rescreened continuous tone and line work data file generated as a result of the procedure performed relative to block 66 (FIGS. 6A–6B) as well as the rescreened mask data file generated at block 66. After the merge edge routine (block 70) is performed, then engraving drive signals (not shown) are generated by controller 17, digital to analog converter 19 (FIG. 1), and amplifier 29 which energizes engraving head 22 to engrave the merged image pattern 50 (FIG. 4). The engraving procedure and method is then complete.

Advantageously, this system and method enables an image such as image 50 in FIG. 4, comprising or representing a plurality of data sets and/or representing a plurality of density values to be merged and their associated data to be selectively processed in order to achieve a predetermined characteristic. As mentioned earlier herein, one predetermined characteristic is to selectively enhance some or all image data, for example, an engraved area, such as edge 54a (FIG. 4) defined by line work columns 54b and 54c within line work area 54. Likewise, continuous tone edges, such as edge 52a, defined by continuous tone columns 52b and 52c, may be enhanced, while transition edges, such as the transition edge 58 defined by columns 60b and 62a, within the transition area 63 is selectively not modified. This facilitates reducing or eliminating "halo" or "ghost" image patterns of the type illustrated in FIG. 9.

A system, method and procedure for performing the aforementioned selective enhancement will now be described beginning with FIG. 6A. First, processor 17 receives the continuous tone data file and line work data file corresponding to an image, such as image 50 in FIG. 4, to be engraved. In the embodiment being described, the continuous tone data and line work data files may be input by an operator or otherwise generated. The mask data file corresponding to the image to be engraved is also received by controller 17.

Once these data files are generated and stored in processor 17, then they are opened (blocks 77b thru 80 in FIG. 6A). A merged and rescreened continuous tone and line work data file is also opened and prepared to receive data (block 74) by processor 17. The routine proceeds at block 82 to obtain a single revolution of continuous tone data from the continuous tone data file. It should be appreciated that the revolution of data corresponds to the density values for a single helical or cylindrical series of engraved areas along a single column, such as column 60a in FIG. 4, during one complete revolution of cylinder 14. At blocks 84 and 86 processor 17 also obtains a revolution of line work data from the line work data file and a revolution of mask data from the mask data file (block 86).

It should be appreciated that the continuous tone data file, line work data file, and mask data file may be at the same or different resolutions. In this regard, line work data generally corresponds to areas of an image that comprise lines or sharp black-to-white or white-to-black transitions, such as with number and letter characters. As mentioned earlier, the line work data file is typically stored in processor 17 at a resolution of about 1000–3000 dpi. The continuous tone data file generally corresponds to continuous tone images which may be generally characterized as image data having varying degrees of shade tones and associated density values. This type of continuous tone data is usually stored at a resolution of about 100–500 dpi and in the embodiment being described, is typically at about 300 dpi. Consequently, in order to merge the two data files together, it may be necessary to scale, sample or rescreen at least one of the data files to the resolution of the other. Alternatively, both data files may be rescreened to a common resolution for further processing.

It should be appreciated that if the data files are at the same or about the same resolution, then rescreening may not be necessary.

In the embodiment being described, the continuous tone data is rescreened to the resolution of the line work data (block 88 in FIG. 6A). At block 90, a continuous tone pixel from the continuous tone data file is obtained by processor 17. Likewise, a line work pixel and a mask pixel are obtained from the line work data file (block 92) and mask data file (block 94), respectively.

In the embodiment being described, the mask data in the mask data file has a resolution similar to the line work data file which is about 2000 dpi. It should be appreciated that the continuous tone pixel, line work pixel and mask pixel obtained at blocks 90, 92 and 94 each correspond to the same location in the image to be engraved.

At this point, the mask data file is used to generate a Rev buffer file of data. Thus, at decision block 96, it is determined whether the mask pixel is equal to 255. If it is, then this would represent a continuous tone pixel and, accordingly, the corresponding continuous tone pixel is stored in the Rev buffer file in processor 17 (block 98). If it is not, then the corresponding line work pixel is stored by processor 17 in the Rev buffer file (block 100).

At block 102, it is determined if there are more pixels in the revolution being evaluated, and if there are, then the routine loops back to block 90 as shown. Otherwise, the merged data in the Rev buffer file is rescreened (block 104 in FIG. 6B) to a final destination or engraving resolution. Thus, because the resolution may vary from one engraving to another, processor 17 may be programmed to rescreen the data associated with the Rev buffer file to various resolutions. In the embodiment being described, the engraving typically has a resolution of between about 100 to 500 dpi, and consequently, the Rev buffer file is rescreened to between 100 to 500 dpi.

At block 106 (FIG. 6B), the rescreened Rev buffer file data is then stored by processor 17 in the merged and rescreened continuous tone and line work data file (block 106).

At decision block 108 (FIG. 6B), it is determined if there are more revolutions of data for the image to be processed. If so, the routine loops back to block 82 (FIG. 6A) as shown. Otherwise, the files are closed by processor 17 at block 110 (FIG. 6B) at which time the routine is complete.

After the merge and rescreen routine (FIGS. 6A and 6B) is performed (block 66 in FIG. 5), then the mask data file is rescreened in accordance with the procedure outlined in FIG. 7, wherein a destination mask data file is opened by processor 17 (block 112). Processor 17 also opens the mask data file (block 114). The routine proceeds to block 116 where processor 17 obtains a revolution of mask data from the mask data file. The revolution of mask data is rescreened from about 1000-3000 dpi (block 118) to a destination resolution which corresponds to a predetermined engraving resolution. In the embodiment being described, the predetermined engraving resolution comprises a lower resolution on the order of about 100-500 dpi and is the same as the dpi resolution used in block 104 in FIG. 6B.

At block 120, the rescreened mask data is stored in the destination mask data file. At decision block 122, it is determined if other revolutions of mask data associated with the next or other columns (as viewed in FIG. 4, for example) exist. If they do exist, then the routine loops back to block 116 as shown. Otherwise, processor 17 closes the destination mask data file (block 124) and the routine exits.

As shown in FIG. 5, the method and apparatus of the invention then proceeds to block 70 where the invention processes the data in the merged and rescreened continuous tone and line work data file to have a predetermined characteristic, such as a composite continuous tone and line work image having transition areas which define edges which are selectively enhanced or not enhanced as desired.

Advantageously, this invention also facilitates enhancing edges within continuous tone area 54 (FIG. 4) or line work area 52, as desired. Selective data processing is achieved in accordance with the procedure outline relative to FIG. 8 where processor 17 begins by opening a merge/edge file for receiving data (block 126) and also the merged and rescreened continuous tone and line work data file (block 128) generated during the merge procedure described relative to FIGS. 6A-6B. After the processor 17 opens the merged and rescreened continuous tone and line work data file (block 128), the destination mask data file is opened (block 130). Processor 17 obtains a pixel of data from the merged and rescreened continuous tone and line work data file (block 132) and also obtains a corresponding mask pixel from the destination mask data file generated in accordance with the procedure described relative to FIG. 7.

At decision block 136, it is determined whether the mask pixel equals a density value of 255. It should be appreciated that in the embodiment being described, the density values stored in the various data files range from zero to 255, with zero representing a light area in the image and 255 representing a dark or full black area in the image. However, any suitable density values may be selected as desired.

It should be appreciated that the rescreened mask file comprises a plurality of density values. Namely, the continuous tone data is represented by a hex value of 255, the line work data is represented by a hex value of 0, and the transition data at the continuous tone and line work junction has density values ranging from 1-255 hex.

If the decision at decision block 136 is yes, then the routine proceeds to decision block 138 where it is determined if the mask pixels surrounding the corresponding mask pixel also equal 255. If the decision at block 138 is yes, then this would indicate that the corresponding mask pixel as well as the surrounding pixels are all of the same value, namely 255, which would correspond to a continuous tone area.

At this point, the routine would proceed to a continuous tone edge routine (block 146). In the embodiment being described, the continuous tone edge routine receives a merge pixel from the merged and rescreened continuous tone data file and may process it in order to accentuate or emphasize an edge in the continuous tone area 54 (FIG. 4).

For example, as shown in the edge area 54a in FIG. 4, notice that the continuous tone data for the continuous tone column 54b of engraved area has been processed such that when corresponding engraved areas are engraved, they have a density which is slightly larger than before processing. Likewise, notice the continuous tone data associated with the adjacent column of continuous tone engraved areas (column 54c in FIG. 4) has been processed such that the engraved areas have a density which is slightly smaller than before processing. This processing has the effect of accentuating the continuous tone edge area 54a within the continuous tone portion 54 of image 50.

After the continuous tone edge routine is performed at block 146 (FIG. 8), then the merge pixel from the merged and rescreened continuous tone and line work data file is stored by processor 17 in a merge/edge file (block 148).

If the decision at decision block 136 is negative, then the routine proceeds to decision block 140 where it is determined whether or not the corresponding mask pixel equals zero. If it does, this would indicate that the mask pixel corresponds to a line work pixel in the image. If it is, then it is determined (decision block 142) whether mask pixels surrounding the corresponding mask pixel also equal zero. If the mask pixel surrounding the corresponding mask pixels are all zero, then the line work edge routine (block 144) may be performed on the merge pixel from the merged and rescreened continuous tone and line work data file which corresponds to the mask pixel selected at block 134. This merge pixel is processed so that ultimately the engraved areas, such as engraved column 52b in FIG. 4, is enhanced or enlarged relative to a normal engraved area (such as the column to the left of column 52b in FIG. 4). Likewise, engraved column 52c is caused to be reduced in density relative to the normal column of engraved areas. This, in turn, causes a contrast in the line work edge area 52a to be emphasized or enhanced. After the line work edge routine (block 144 in FIG. 8) is performed, the processor 17 stores the merge pixel in the merge/edge file (block 148).

If the decision at decision blocks 138, 140 or 142 is negative, then the merge pixel is selectively not processed in order to cause the image to be engraved to comprise at least one predetermined characteristic, such as a non-enhanced edge, like transition edge 63 in FIG. 4. In this regard, it should be appreciated that the invention comprises an identifier or identifying means 148 (FIG. 8) in processor 17 for identifying transition areas, such as transition area 63 in FIG. 4. Thus, by using the corresponding mask pixel and surrounding mask pixels from the destination mask data file, transition areas between continuous tone areas, such as continuous tone area 54 in FIG. 4, and line work areas, such as line work area 52, can be identified. Once the transition area 54 is identified, the transition data associated with that area 54 may be selectively processed by processor 17 such that a portion or all of image 50 can be processed to have a predetermined characteristic, such as either an enhanced or non-enhanced edge.

in this regard and as shown in FIG. 4, notice that the edges within transition area 63 have not been enhanced, while edges within line work area 52 and continuous tone area 54 have enhanced edges 52a and 54a, respectively. This facilitates eliminating the "halo" or "ghost" problems of the past.

Thus, once the processed or non-processed merge pixel is stored by processor 17 the routine proceeds to decision block 152 where it is determined whether more pixels remain in the merged and rescreened continuous tone and line work data file. If there are, then the next merge pixel is obtained (block 132) and the routine continue to block 134 as shown.

If the decision at decision block 152 is negative, then all files are closed by processor 17 (block 154) and the routine exits.

After all merge pixel data in the merged and rescreened continuous tone and line work data file has been processed, then engraving may be performed (block 72 in FIG. 5). As mentioned earlier herein, the merge/edge file generated by processor 17 using the routine in FIG. 8 is then used to generate engraving drive signals similar to those shown in FIG. 4 relative to the embodiment described above using a digital to analog converter 19. The engraving drive signal is then amplified by amplifier 29 and used to energize engrave head 22 which in turn causes engraving device 23 to oscillate as cylinder 14 rotates in order to effect engraving the image 50 (FIG. 4) having the characteristics described herein.

Advantageously this system and method provides an image data generator for creating image data comprising various density tones or levels, such as for continuous tone data, line work data and transition data; means for locating the transition data and further means for selectively processing the image data. Also, features of this invention may be used for merging data for use in composing film or picture images or for composing or merging film or data that will be merged or transferred to other files for other printing, proofing or processing.

A method for using this embodiment will now be described. The cylinder 14 is rotatably mounted between headstock 16 and tailstock 18 at the engraving station 15. Processor 17 energizes drive motor 28 to rotatably drive cylinder 14. The controller 17 energizes drive motor 21 to drive carriage 24 towards end 14A of cylinder 14. At this point, one or more test cuts may be performed as desired and then engraving can begin.

The image data associated with an image to be engraved is then processed in the manner described with respect to FIGS. 1–8. It should be appreciated that this image data could have been pre-processed prior to the engraving operation. Also, either before or after the image data is processed in accordance with this embodiment, features of the parent application Ser. No. 08/434,592 may also be performed.

Once the image data is selectively processed, engraving is performed by engraver 10 when controller 17 energizes drive motor 21 to drive carriage 24 as engraving device 23 is excited in response to the processed image data, thereby effecting engraving of one or more engraved areas or cells which make up a pattern, such as the pattern 50 shown in FIG. 4.

After engraving is complete, processor 17 can energize drive motors 46 and 48 headstock 16 and tailstock 18, respectively, so that cylinder 14 can be removed.

Cylinder 14 may then be placed in a printing press so that printing on a web of material or workpiece can be performed.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims. For example, features of this invention have been described with continuous tone and line work data files, but they may also be used in connection with any combination or type of image data.

What is claimed is:

1. A method for engraving by comprising the steps of:

providing an image having a first area represented by a first set of image data and a second area represented by a second set of image data;

generating a mask file of data corresponding to said image;

rescreening at least one of said first set of image data or said second set of image data to the same resolution as said second set of image data or said first set of image data, respectively;

merging said first and second sets of data using said mask file to provide a merged image data file;

rescreening said merged image data file to a predetermined resolution;

rescreening said mask file of data to a predetermined resolution to provide a rescreened mask file of data, said rescreened mask file of data comprising first mask data corresponding to said first set of image data, second mask data corresponding to said second set of image data and transition data corresponding to a transition area associated with a juncture of said first and second sets of data;

generating said processed image data file using said merged image data and said rescreened mask file.

2. The method as recited in claim 1 wherein said method further comprises the step of:

selecting a merged image data pixel in said merged image data;

identifying a corresponding mask pixel in said rescreened mask file.

3. The method as recited in claim 2 wherein said method comprises the step of:

using said corresponding mask pixel to determine whether said merged image data pixel is associated with said first set of image data, said second set of image data, or said transition data.

4. The method as recited in claim 3 wherein said method further comprises the step of:

determining that said corresponding mask pixel corresponds to said first data set if its density is equal to a first predetermined density or corresponds to said second data set if its density is equal to a second predetermined density.

5. The method as recited in claim 4 wherein said method further comprises the step of:

performing edge enhancing within said first data set or said second data set if it is determined that said corresponding mask pixel corresponds to said first data set or corresponds to said second data set, respectively.

6. The method as recited in claim 3 wherein said method further comprises the step of:

determining that said corresponding mask pixel corresponds to said transition data if said density of said corresponding mask pixel comprises a third predetermined density.

7. The method as recited in claim 6 wherein said third predetermined density ranges from about 1 to 254.

8. The method as recited in claim 6 wherein said method further comprises the step of:

loading data from said merged image data into said processed image data file for any data corresponding to said transition data.

* * * * *